United States Patent [19]
Olsson

[11] 4,098,395
[45] Jul. 4, 1978

[54] FEEDING DEVICE ESPECIALLY FOR PULP BALES

[76] Inventor: Carl Fritjof Stanley Olsson, Kampastigen 4, S-352 52 Vaxjo, Sweden

[21] Appl. No.: 699,445

[22] Filed: Jun. 24, 1976

[30] Foreign Application Priority Data

Jun. 26, 1975 [SE] Sweden .............................. 7507357

[51] Int. Cl.² .......................................... B65G 19/24
[52] U.S. Cl. ..................................... 198/748; 198/738
[58] Field of Search ............... 198/748, 485, 648, 721, 198/738, 747, 339; 271/149, 150, 213

[56] References Cited

U.S. PATENT DOCUMENTS

| | | | |
|---|---|---|---|
| 823,751 | 6/1906 | Adshead | 198/738 |
| 1,631,125 | 6/1927 | Happel | 198/748 |
| 2,252,469 | 8/1941 | Nyberg | 271/149 |
| 2,696,381 | 12/1954 | Bateman | 271/150 |
| 2,724,485 | 11/1955 | Reading | 198/612 |
| 2,822,079 | 2/1958 | Ascani | 198/747 |
| 2,847,213 | 8/1958 | Duncanson et al. | 271/150 |
| 3,520,422 | 7/1970 | Bruce et al. | 198/721 |
| 3,572,563 | 3/1971 | Oliver | 198/721 |
| 3,598,400 | 8/1971 | Nelson | 271/150 |
| 3,659,701 | 5/1972 | Taccone | 198/748 |
| 3,759,509 | 9/1973 | Peterson | 271/150 |
| 3,863,922 | 2/1975 | Peeples | 198/738 |
| 3,949,859 | 4/1976 | Nussbaumer et al. | 198/648 |
| 4,006,814 | 2/1977 | Wilkes et al. | 198/472 |

Primary Examiner—Evon C. Blunk
Assistant Examiner—Richard K. Thomson
Attorney, Agent, or Firm—Albert L. Jeffers; John F. Hoffman

[57] ABSTRACT

A feeding device for feeding goods or materials of the kind having several layers and/or having a tendency to separate into layers into a processing machine in a direction generally parallel with those layers, for example, for feeding pulp bales into a disintegrating machine comprising a roller conveyor for displaceably supporting the goods and a driving device to engage the goods and displace those goods along the roller conveyor in order to force the goods into the processing machine wherein the driving device includes a pusher drivable along the roller conveyor which pusher is adapted to engage with substantially the entire rear or trailing surface of the goods for forcing the goods into the processing machine while substantially uniformly acting on all of the layers of the goods. The pusher is mounted on a carriage which is connected to a drive chain by means of a pin. As the portion of the chain engaged by the pin passes about the sprocket at the end of the conveying run, the teeth of the sprocket push the pin out of the chain thereby disengaging the carriage drive.

3 Claims, 5 Drawing Figure

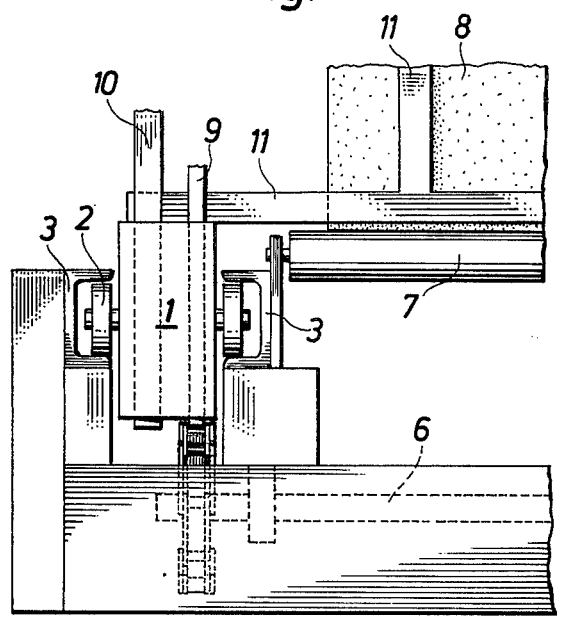
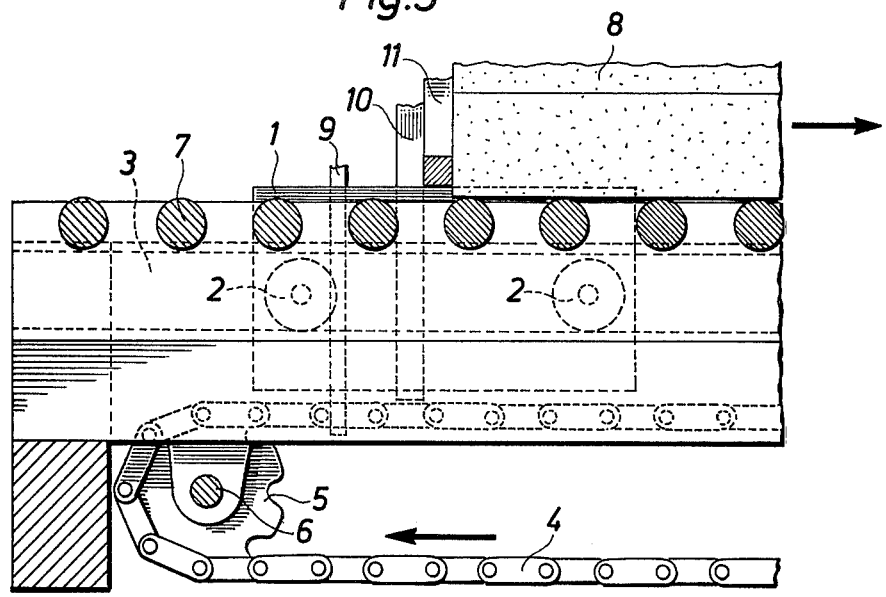

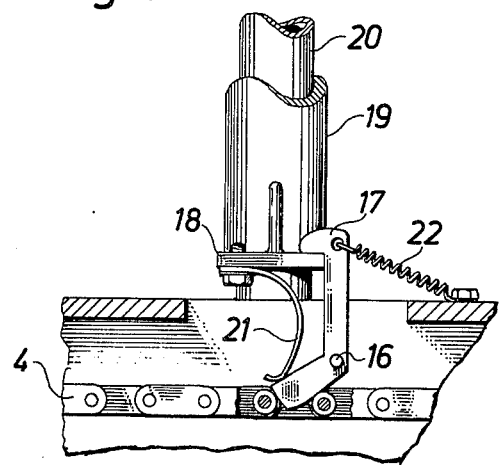
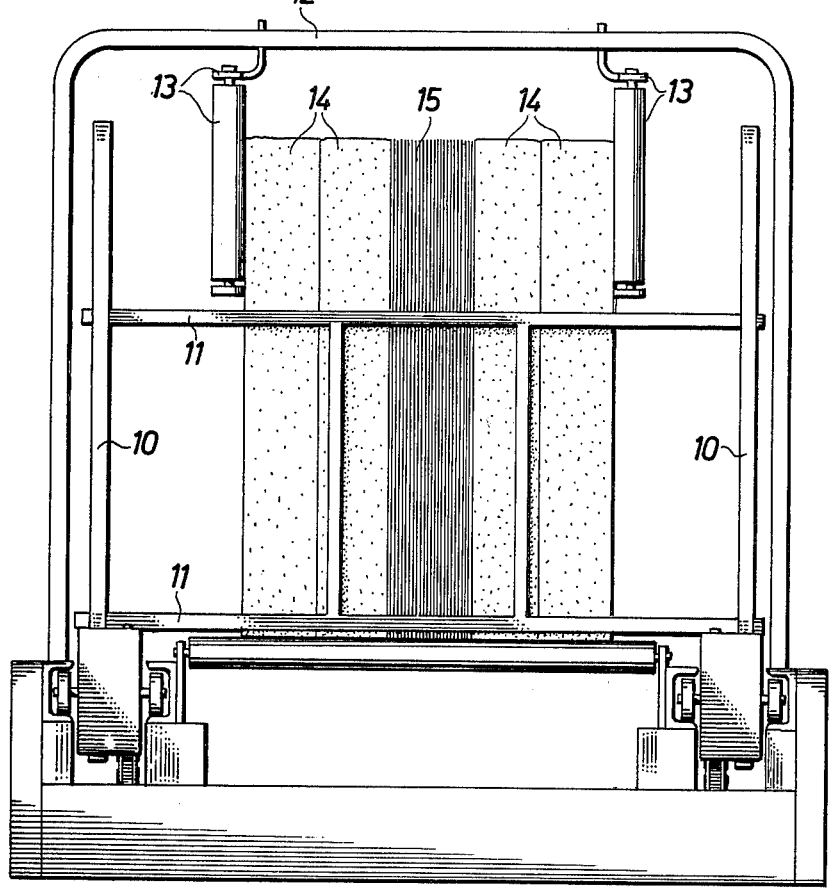

FEEDING DEVICE ESPECIALLY FOR PULP BALES

BACKGROUND OF THE INVENTION

The present invention relates to a feeding device for feeding goods of the kind consisting of several layers or having a tendency to be separated into layers into a processing machine, especially for feeding pulp bales into a disintegrating machine in a direction substantially parallel with said layers.

When a bale of, for example, flake dried pulp is to be dry defibrated it is fed into a disintegrating machine disintegrating the bale into small fibre aggregates. When the bale is fed into the machine it meets with resistance because of the forces of the processing tools of the machine. This resistance can vary across the cross section of the bale which very easily results in a separation of the bale into layers, especially if the bale is of the flake type, this separation in turn resulting in varying feeding speeds at different portions of the bale section. In order to disintegrate the bale into small fibre aggregates having the same size and provide for the same disintegrated amount per time unit it is necessary that all portions of the bale are fed into the machine at the same speed. As the feeding resistance of the bale can vary in the direction of feeding it is not sufficient that the bale feeding force is constant as the varying resistance would thereby result in varying machining speed of different portions of the bale and the risk of damages to the tools of the disintegrating machine.

The present feeding devices for feeding goods of the kind mentioned above are complicated, have a tendency to functional disorders and fail in providing a uniform feeding across the whole cross section of the goods.

SUMMARY OF THE INVENTION

The object of the present invention is to provide a device for correct and uniform feeding of goods of the type mentioned above into a processing machine.

In accordance with the present invention there is provided a feeding device for feeding goods consisting of several layers and/or having a tendency to be separated into layers into a processing machine and especially for feeding pulp bales into a disintegrating machine, the feeding direction being substantially parallel with said layers, comprising a roller conveyor for supporting the goods and a driving device including a pusher device drivable along the roller conveyor and adapted to engage substantially the entire rear surface of the goods in respect of the feeding direction thereof in order to press the goods into the processing machine while substantially uniformly acting on all of the layers of the goods.

In a preferred embodiment of the invention the driving device comprises chain-driven gates or the like, the driving force from the chain to the transported goods being transferred to the gates by means of elements engaging with the links of the chain. The chain is driven by means of teeth or the like of a sprocket or the like engaging and driving the chain. The elements are released from the chain at the end of the feeding movement whereupon the elements transferring the movement from the chain to the goods easily can be returned to start a new feeding operation. In this way there is provided a very safe feeding providing exactly the same feeding speed for all portions of the goods. Because of the fact that the forces transferred to the conveyed goods are very great the force required for releasing the elements engaging the chain is also very great. This fact does not, however, have any disturbing influence on the function as the force which can be exerted by the sprocket is also very great. After the release of the drive transferring element the element can be returned manually or automatically a predetermined distance along the chain and again engage the chain to provide a new feeding operation. Thereby, the driving of the chain or the chains can be provided very easily as there is only required a slow movement in one single direction and there is not required any gearing for rapidly returning of the driving elements.

In an embodiment of the invention the transmission of the feeding force from the chain to the goods is provided by means of carriages running parallel to the chain and provided with elements engagable with the chain and elements engaging the goods, for example, designed as forks or gates. Preferably such a gate is movable perpendicularly to the feeding direction so that it can be moved from the feeding path of the goods when the carriages and the gate are returned from starting a new feeding movement.

BRIEF DESCRIPTION OF THE DRAWINGS

An embodiment of the invention is described in the following with reference to the accompanying drawings.

FIGS. 2 and 3 show details of the feeding device of FIG. 1.

FIG. 4 shows coupling and driving elements of another embodiment of the invention.

FIG. 5 shows the device of FIGS. 1-3 provided with elements for guiding the goods laterally with reference to the feeding direction.

In FIG. 1 there is shown a pulp bale 8 supported by and rolling on a roller conveyor consisting of rolls and having one end positioned adjacent a disintegrating machine for disintegrating the bale into small fibre aggregates. The bale is driven forward by means of a pusher device consisting of a gate 11 engaging the back end surface of the bale. The gate is in turn driven by two rods 10 at their lower ends connected with carriages 1 which are shown more in detail in the FIGS. 2 and 3. Each carriage 1 comprises four rolls 2 (two at each side) by means of which the carriages roll in channel beams 3 facing each other, parallel with the feeding direction and positioned on either side of the roller conveyor. Each carriage also comprises a vertically movable pin 9 which at its lower end can engage with a chain 4 having spaces between the link shafts. The chains are parallel with the channel beams and extend over sprockets 5 supported on a shaft 6 at the end of the feeding device adjacent the disintegrating machine. These sprockets lift the pins 9 out of the chain by means of their teeth especially adapted thereto so that the feeding is discontinued when the pins 9 reach the sprockets 5. Thereupon the carriages having their pins 9 in raised positions can be returned to the starting end of the feeding device together with the gate whereupon one or several new bales can again be fed into the disintegrating machine.

Figure 1:
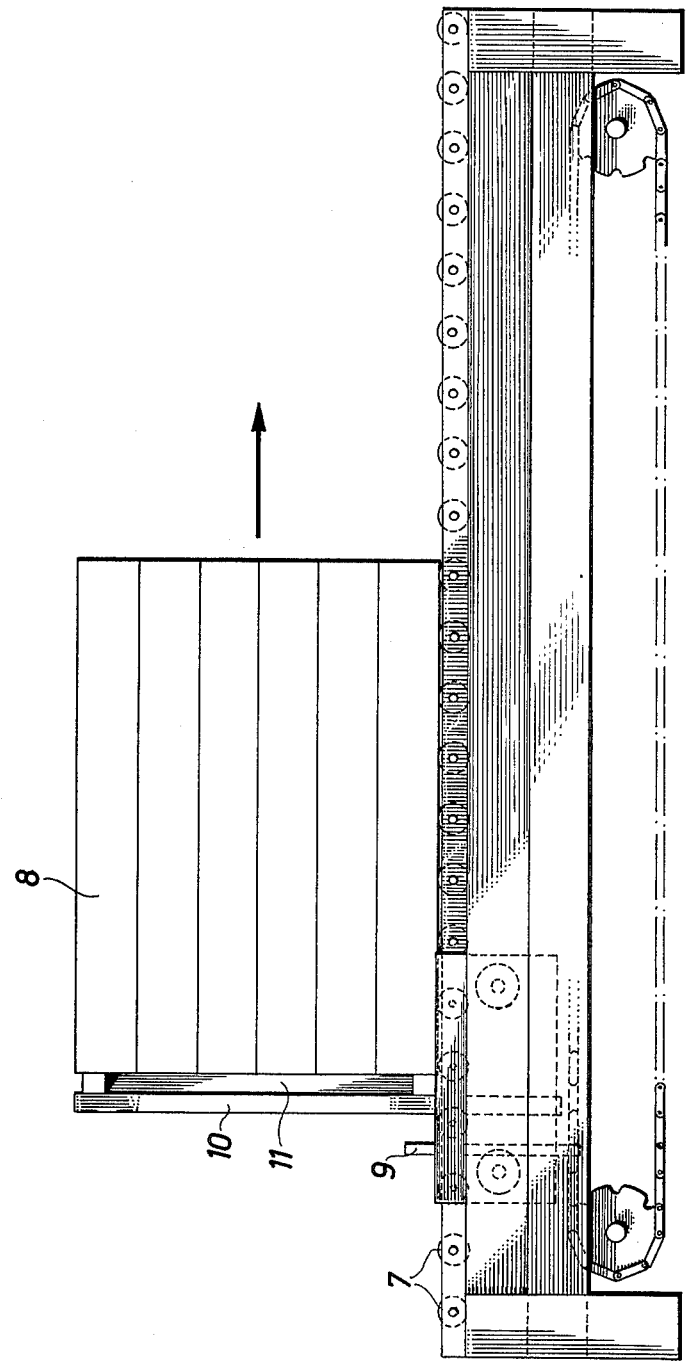
FIG. 1 shows the feeding device according to the invention from one side thereof.

The chains are continuously driven by means of a motor geared down to a suitable degree of reduction through the sprockets 5 on the shaft 6 so that the desired feeding speed is obtained. The channel beams as well as the chains including the driving arrangement and the rolls 7 are journalled in a common frame.

The device is especially suitable for feeding goods consisting of objects stacked on each other or piled edgewise or objects having a great tendency to be separated into layers, for example, pulp bales of the layer type, said bales having a great tendency to be separated into layers if the gate does not cover their ends. In order to maintain layers or the like in a lateral position adjustable guides can be arranged at the sides of the feeding device.

The construction of the gate 11 is shown more in detail in FIG. 5. The feeding device as shown in this Figure is further provided with rolls 13 for laterally guiding the bales, the rolls 13 being arranged on a frame 12 above the bales. This lateral guiding is used especially in connection with the manufacturing of hygenic products for improving the fibre quality of the usually mechanically produced, cheaper pulp by mixing some 20 or 30 percent of chemically produced pulp into the mechanically produced pulp.

As appears from FIG. 5 this mixing can be provided already in connection with the feeding of material into the disintegrating machine. For example, it is possible to place two layers 14 separated from a bale of flake dried mechanical pulp vertically on the rolls of the roller conveyor in the longitudinal feeding direction at each side of a number of layers 15 of chemical pulp, the total thickness of the layers of chemical pulp substantially corresponding to the thickness of one layer of flake dried pulp. When the feeding into the disintegrating machine takes place the machine is continuously supplied with a mixed pulp at a constant ratio of mixture.

In FIG. 4 there is shown an embodiment in which the driving arrangement is provided with an additional automatic function. Thus, a carriage similar to the carriage shown in the embodiment of FIG. 1 is provided with a hook 16 which can engage the chain 4. This hook 16 is at its upper end provided with a latch 17 which in the driving position engages a projection 18 on the gate. The gate is movable in a vertical plane by being slidably journalled by means of two tubes 19 on two tubes 20 connected with the carriages. On the projection 18 there is further provided a spring 21 adapted to force the hook 16 down into engagement with the chain. Thus, the hook 16 locks the gate in the lower position thereof by engagement with the chain 4 until the sprocket lifts the hook 16 upwards out of the chain. Thereby, the gate is released and is raised to a position wherein the gate can pass the bales during a return movement. In order to obstruct the hook 16 from engaging the chain during the return movement the hook 16 is provided with a small spring 22 having less influence on the hook 16 than the spring 21 and turning the hook 16 to a non-engaging position in relation to the chain as soon as the spring 21 has terminated to act on the hook 16. The return movement of the gate and the carriages can be provided manually or automatically by means of a spring or counter weight arrangement which is not shown, as soon as the gate and the carriages have been released from the bales on the roll path and on the chains, respectively. However, the automatic function of FIG. 4 can not be used together with the device of FIG. 5.

I claim:

1. Apparatus for feeding goods of the type having a tendency to separate into layers into a processing machine in a direction generally parallel with the layers comprising:

a roller conveyor for movably supporting the goods, a pair of channel beams positioned on each side of said roller conveyor, a carriage positioned between each pair of said channel beams, each said carriage having a pair of rollers on each side thereof, said pairs of rollers being disposed respectively within said channels so as to guide said carriages, a gate adapted to engage the goods supported on said roller conveyor, a pair of vertical rods connected respectively to said carriages and positioned to engage said gate, a pair of chains engaged by driven sprockets, said chains having link shafts separated by spaces, and vertically movable pin means received in each said carriage, said pin means having lower ends in engagement respectively with said chains in the spaces between said link shafts and adapted to be released from said chains by the teeth of said sprockets.

2. In a machine for pressing goods into a processing machine, the combination of:

a conveyor for the goods, channel beams parallel to said conveyor, a carriage having rollers guided by and rolling in said channel beams, pusher means connected to said carriage and extending over said conveyor to push the goods forward, a chain running over at least one driven sprocket, said chain having a plurality of link shafts and spaces therebetween, movable pin means received in said carriage and having a lower end for releasably engaging said chain by being inserted into the spaces of said chain, said sprocket including means in the form of teeth for engaging said pin means to thereby release the same from said chain and disengage said carriage.

3. A feeding device for feeding goods of the kind having a tendency to separate into layers into a processing machine in a direction generally parallel with the layers comprising:

a roller conveyor for movably supporting the goods, pusher means for engaging generally the entire rear surface of the goods for feeding the goods into the processing machine, a drive chain, carriage means for guiding said pusher means along said roller conveyor, said carriage means being guided in at least one track extending parallel with said roller conveyor, said carriage including engagement means for engaging said drive chain in order to establish a driving connection between said carriage and said drive chain, said pusher means being connected to and supported by said carriage, said chain extending over a sprocket at the end of said roller conveyor, said engagement means being adapted to be released from said chain by the teeth of said sprocket at the end of said roller conveyor initiating the return of said carriage means and said pusher means to the feeding start position.

* * * * *